July 3, 1962

G. ALFIERI 3,042,456

PNEUMATIC BRAKE SYSTEM

Filed Nov. 5, 1958

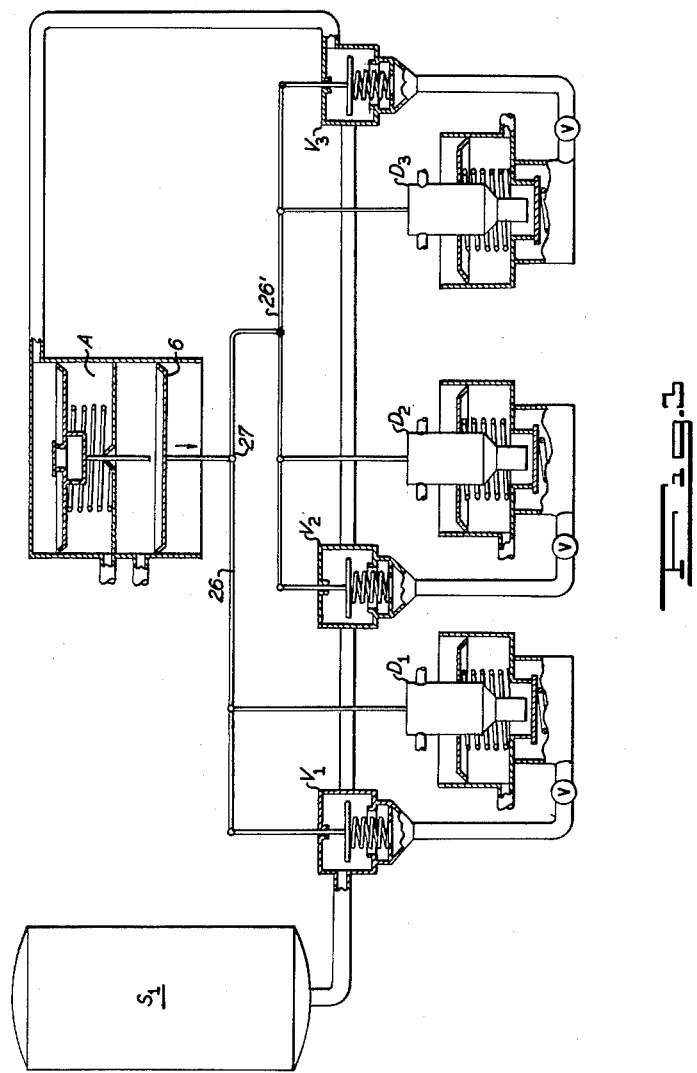

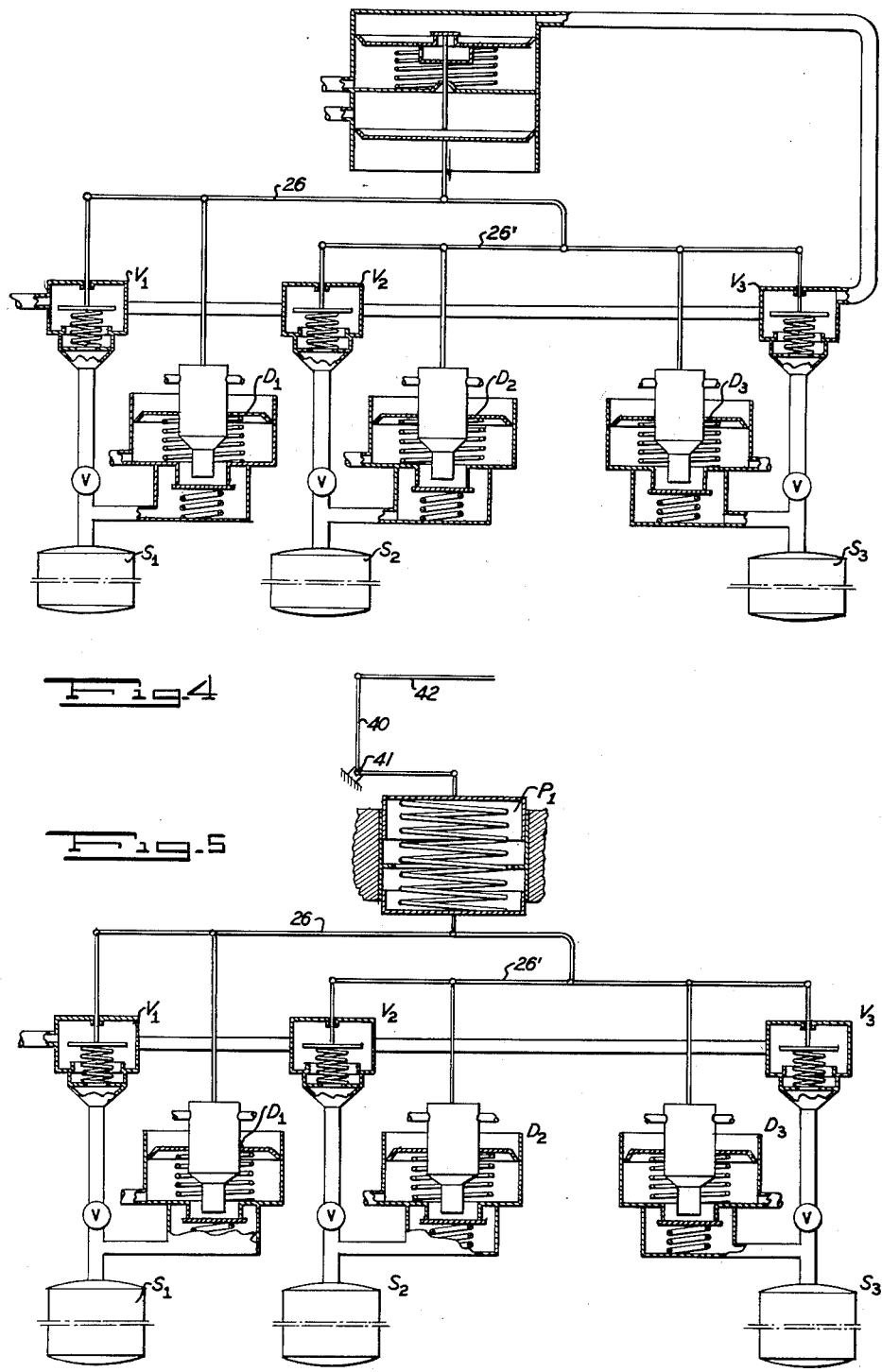

United States Patent Office 3,042,456
Patented July 3, 1962

3,042,456
PNEUMATIC BRAKE SYSTEM
Giuseppe Alfieri, Milan, Italy, assignor to Fabbrica Italiana Magneti Marelli S.p.A., Milan, Italy, a company of Italy
Filed Nov. 5, 1958, Ser. No. 772,108
Claims priority, application Italy Nov. 5, 1957
1 Claim. (Cl. 303—29)

This invention relates to braking equipment.

It is an object of the present invention to provide improvements in pneumatic equipment having two or more braking sections such that in case of failure or breakdown the damaged section only becomes ineffective while all the other sections remain operable.

As compared with conventional multi-section equipment, the instant improvements permit the positive isolating of the section or sections damaged at the time of actuating the associated supply valves as will be shown.

The improvements are characterized in that a lever system for actuating the supply valves for the various sections also controls cut-off valves. The lever system is normally balanced and maintains the cut-off valves open whereby a pneumatic medium under pressure is supplied to the various sections. A breakdown causes an unbalancing of the lever system resulting in the closing of the intercepting valve associated with the damaged section thereby preventing the flow of the medium to the damaged section.

The aforementioned lever system is advantageously constituted by a simple or multiple rocker having arms each controlling the supply valve of one section and the respective cut-off valve in such a manner that in a first portion of its stroke the arm actuates the supply valve while leaving the valve open and which, in a further stage of its stroke, causes the closure of the valve.

The control of the simple or multiple rocker may be either by pneumatic servocontrol such as an automatic relay valve, or mechanically through a lever system connected directly to the brake pedal.

The instant improvements are illustrated, by way of example, in the accompanying drawings wherein:

FIG. 3 represents the diagram of an equipment with three sections and one tank, with a pneumatic servocontrol;

FIG. 4 represents the diagram of an equipment similar to that of FIG. 3, but with three tanks;

FIG. 5 represents the diagram of an equipment similar to that of FIG. 4, but with a mechanical control in lieu of pneumatic control.

Figure 1:
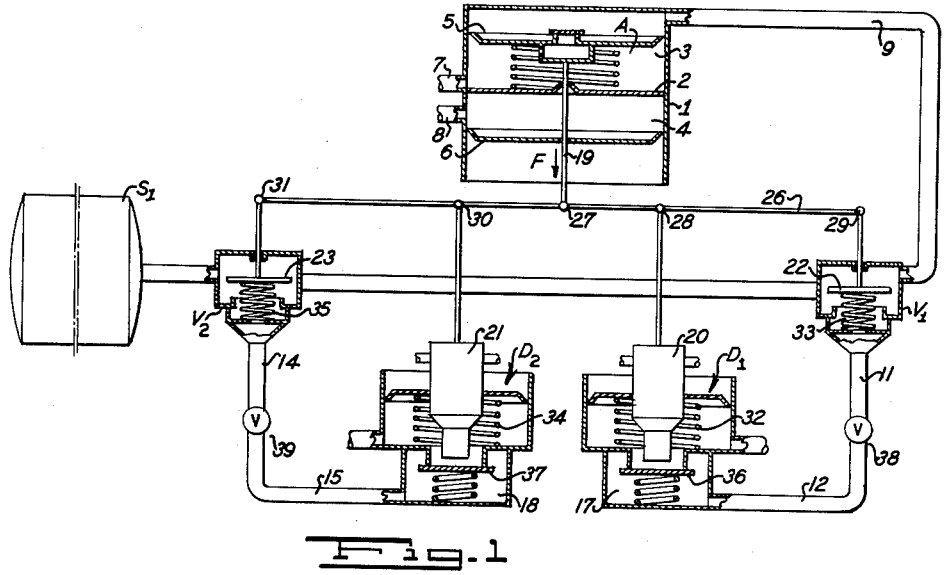
FIG. 1 represents the diagram of a braking arrangement according to the invention with two sections and only one tank and with a pneumatic servocontrol.

The equipment illustrated in FIG. 1 comprises essentially an automatic relay valve A of conventional kind, two supply valves $D_1$ $D_2$ for the actuation of the operating members for the respective braking sections, two cut-off valve groups $V_1$ $V_2$ and one source of pneumatic medium or compressed air tank $S_1$. The member A includes a cylinder 1 subdivided by a separating wall 2 into two chambers 3 and 4, wherein there slide respectively piston 5 and piston 6, the chamber 3 being connected through the conduit 7 with the emergency line (not shown) of the equipment and being permanently fed with air under pressure, while the chamber 4 is connected through the conduit 8 with a service line (not shown) so that compressed air flows thereinto during braking and flows therefrom as soon as the braking action ceases. The chamber 3 with air permanently under pressure is connected by means of the conduits 9—10 to the two valve groups $V_1$ $V_2$ through which, by means of the conduits 11—12 and 14—15, it supplies the pre-chamber 17 of the supply valve $D_1$ and the pre-chamber 18 of the supply valve $D_2$, in addition to which these chambers are fed by tank $S_1$.

The piston 6 with its stem 19 controls mechanically the hollow pistons 20 and 21 of supply valves $D_1$ $D_2$ and the spring-loaded movable members 22—23 of the two valve groups $V_1$—$V_2$ through a rocker 26 hinged at central point 27 to the stem 19; on one of the arms of said rocker there are articulated at 28—29 the pusher (or rod) of the piston 20 and that of the movable member 22, while on the other arm there are articulated at 30—31 the pusher of the piston 21 and that of the movable member 23.

The force for the displacement of the control piston 6 and, therefore, of the rocker 26 in the direction of the arrow F is opposed by the reactions of the springs 32—33 and 34—35, which effort and reaction are balanced under normal braking conditions in such a manner that the rocker 26 is displaced parallel to itself, its stroke being established in such a manner that while the pistons 20 and 21 reach and open the respective inlet valves or controls 36 and 37, the movable members 22 and 23 of the valve groups $V_1$ $V_2$ do not reach their own seats thereby leaving open the communications between the conduits 9—10 and 11—14.

If in case of failure, for instance air leakage from one of the two braking sections, the equilibrium is destroyed and the excess of control force causes the rotation of the rocker around its fulcrum and the lowering of its arm at the side of the cut-off valve for the damaged section, so that the valve group closes and, while the damaged section is isolated, the other section goes on operating regularly.

The cut-off cocks 38—39 permit avoiding waste of compressed air in that the damaged section can be isolated from the feed until repair has been carried out.

Figure 2:
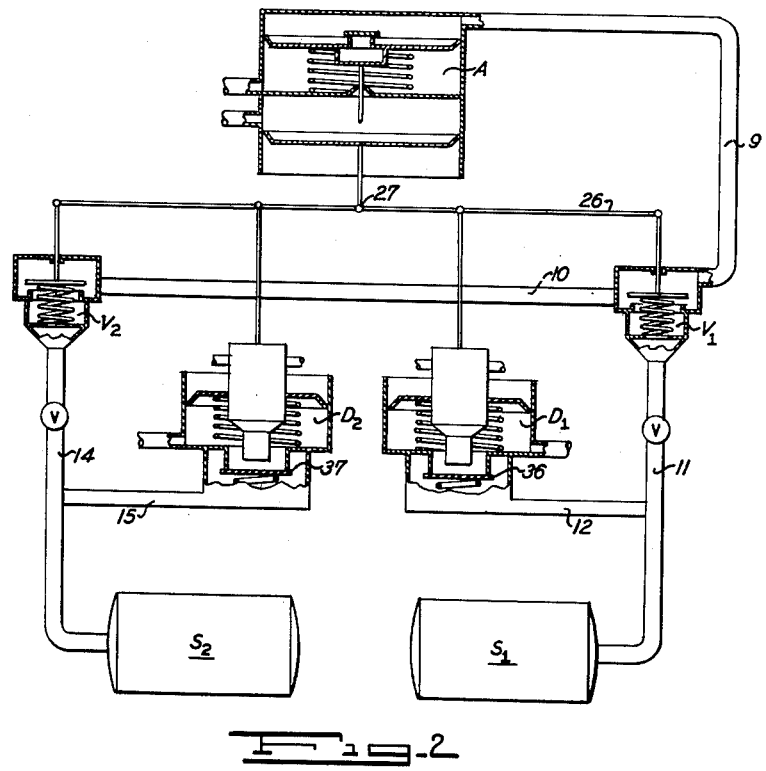
FIG. 2 represents the diagram of a device similar to that of FIG. 1 but with two tanks.

The equipment illustrated in FIG. 2 is quite similar to that of FIG. 1 with the only difference being that there are provided two compressed air tanks $S_1S_2$ respectively connected with the conduits of the respective supply valves $D_1D_2$.

In FIG. 3, there is illustrated an arrangement with three braking sections with one single tank $S_1$ and with three supply valves $D_1D_2D_3$. The equipment operates as the preceding ones, the sole difference being in the rocker which is multiple in lieu of being simple, whence the control force coming from the piston 6 is transmitted to the rocker 26, articulated at 27, and is thereby transmitted again by one of the arms to the supply valve $D_1$ and to the valve group $V_1$, and by the other arm to a second rocker 26' which transmits the control force by each of two arms to the respective groups $D_2V_2$ and $D_3V_3$. In FIG. 4 there is illustrated the same arrangement as in FIG. 3 but with three tanks one tank being connected to the conduit of each respective supply valve.

Finally in FIG. 5 there is illustrated an arrangement similar to that in FIG. 4, wherein however the control of the rocker is effected mechanically by means of direct connection of the spring loaded member $P_1$, of conventional type, with the brake pedal, for instance through the lever 40 fulcrumed at 41 and the link 42.

Of course the mechanical control can be applied also in all other cases previously illustrated without departing from the scope of the invention.

What is claimed is:

A pneumatic braking arrangement for operating a plurality of braking sections and comprising a source of pneumatic medium, a supply valve for each of said sections for controlling the supply of pneumatic medium thereto, a cut-off valve for each of said supply valves and connected thereto for distributing said pneumatic medium thereto and lever means operatively coupled to said supply valves and cut-off valves to selectively block off the supply of the pneumatic medium to the sections in response to pressure losses therein, said lever system comprising a lever for each of said valves, said levers being pivotally connected together and arranged in pairs, each pair being constituted by a lever for a supply valve and a lever for the associated cut-off valve, said pairs of levers normally permitting uniform displacement of the lever system whereby each said supply valve and associated cut-off valve is open to provide fluid communication between said source and said section, said lever system being unbalanced with a loss of pressure in one of said sections to displace said cut-off valve associated with said one section to a closed position to interrupt the fluid connection between said source and said one section.

References Cited in the file of this patent

UNITED STATES PATENTS

| | | |
|---|---|---|
| 2,141,688 | Eaton | Dec. 27, 1938 |
| 2,195,214 | Jacob | Mar. 26, 1940 |
| 2,515,946 | Cadman | July 18, 1950 |
| 2,854,016 | Margida | Sept. 30, 1958 |
| 2,857,584 | Gibson | Oct. 21, 1958 |
| 2,874,002 | Cambeis | Feb. 17, 1959 |

FOREIGN PATENTS

| | | |
|---|---|---|
| 549,930 | Italy | Oct. 18, 1956 |